US011555094B2

(12) United States Patent
Carella et al.

(10) Patent No.: US 11,555,094 B2
(45) Date of Patent: Jan. 17, 2023

(54) METHOD FOR STABILIZING AQUEOUS DISPERSIONS OF FLUORINATED POLYMERS

(71) Applicant: SOLVAY SPECIALTY POLYMERS ITALY S.P.A., Bollate (IT)

(72) Inventors: Serena Carella, Parabiago (IT); Eliana Ieva, Alessandria (IT); Mirko Mazzola, Milan (IT); Giulio Brinati, Milan (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 302 days.

(21) Appl. No.: 16/638,388

(22) PCT Filed: Mar. 20, 2018

(86) PCT No.: PCT/EP2018/057008
§ 371 (c)(1),
(2) Date: Feb. 11, 2020

(87) PCT Pub. No.: WO2018/104564
PCT Pub. Date: Jun. 14, 2018

(65) Prior Publication Data
US 2020/0362118 A1    Nov. 19, 2020

(30) Foreign Application Priority Data

Aug. 11, 2017  (EP) .................... 17185838

(51) Int. Cl.
| | |
|---|---|
| *C08J 3/05* | (2006.01) |
| *C08J 5/22* | (2006.01) |
| *C09D 127/16* | (2006.01) |
| *H01G 11/26* | (2013.01) |
| *H01G 11/52* | (2013.01) |
| *H01G 11/84* | (2013.01) |
| *H01M 4/62* | (2006.01) |
| *H01M 10/0525* | (2010.01) |
| *H01M 50/403* | (2021.01) |
| *H01M 50/411* | (2021.01) |
| *H01M 50/449* | (2021.01) |

(52) U.S. Cl.
CPC .............. *C08J 3/05* (2013.01); *C08J 5/2262* (2013.01); *C09D 127/16* (2013.01); *H01G 11/26* (2013.01); *H01G 11/52* (2013.01); *H01G 11/84* (2013.01); *H01M 4/623* (2013.01); *H01M 10/0525* (2013.01); *H01M 50/403* (2021.01); *H01M 50/411* (2021.01); *H01M 50/449* (2021.01); *C08J 2327/16* (2013.01)

(58) Field of Classification Search
CPC ........ C08J 3/05; C08J 5/2262; C08J 2327/16; C09D 127/16; H01G 11/26; H01G 11/52; H01G 11/84; H01M 4/623; H01M 10/0525; H01M 50/403; H01M 50/411; H01M 50/449; H01M 50/446; H01M 50/426; Y02E 60/10; C08F 214/22; C08F 220/06; C08F 220/18; H01B 1/12
USPC ........................................................ 252/500
See application file for complete search history.

(56) References Cited

U.S. PATENT DOCUMENTS

| | | | |
|---|---|---|---|
| 3,857,827 A | 12/1974 | Dohany | |
| 5,880,204 A | 3/1999 | McCarthy et al. | |
| 6,169,139 B1 | 1/2001 | van Cleeff | |
| 10,333,146 B2* | 6/2019 | Cojocaru | H01M 4/36 |
| 10,450,657 B2* | 10/2019 | Cojocaru | C23C 18/1635 |
| 10,533,109 B2* | 1/2020 | Zheng | C09D 7/20 |
| 10,586,964 B2* | 3/2020 | Hamon | H01M 50/411 |
| 2002/0193500 A1 | 12/2002 | Hintzer et al. | |
| 2008/0097060 A1 | 4/2008 | Bissinger et al. | |
| 2010/0304270 A1 | 12/2010 | Amin-Sanayei | |
| 2014/0120426 A1 | 5/2014 | Abusleme et al. | |
| 2014/0154573 A1* | 6/2014 | Stanga | H01M 4/622 252/182.1 |
| 2014/0342224 A1* | 11/2014 | Cojocaru | H01M 4/485 29/25.03 |
| 2015/0020947 A1 | 1/2015 | Stanga et al. | |
| 2015/0329701 A1 | 11/2015 | Tsuda et al. | |
| 2015/0340676 A1 | 11/2015 | Schmidhauser et al. | |
| 2015/0349309 A1* | 12/2015 | Abusleme | C08L 27/16 429/251 |
| 2016/0204405 A1* | 7/2016 | Hamon | H01M 50/431 429/144 |
| 2016/0268599 A1* | 9/2016 | Damen | H01M 10/058 |

FOREIGN PATENT DOCUMENTS

| | | | | |
|---|---|---|---|---|
| EP | 1897902 A1 | 3/2008 | | |
| JP | 2002513051 A | 5/2002 | | |
| WO | WO-9955746 A1 * | 11/1999 | | C08F 14/22 |
| WO | 2008129041 A1 | 10/2008 | | |
| WO | 2013010936 A1 | 1/2013 | | |
| WO | 2013120858 A1 | 8/2013 | | |
| WO | 2014095907 A1 | 6/2014 | | |
| WO | 2015059155 A1 | 4/2015 | | |
| WO | 2016003748 A1 | 1/2016 | | |
| WO | WO-2016149400 A1 * | 9/2016 | | C08J 9/0061 |

OTHER PUBLICATIONS

Standard ISO 13321—Particle size analysis—Photon correlation spectroscopy—Jul. 1, 1996—p. 1-20.

* cited by examiner

*Primary Examiner* — Douglas J McGinty
(74) *Attorney, Agent, or Firm* — Osha Bergman Watanabe & Burton LLP

(57) ABSTRACT

The present invention relates to a method for stabilizing aqueous dispersions, notably of polymers based on vinylidene fluoride (VDF), and to the use of the stabilized aqueous dispersion thus obtained in electrochemical applications.

20 Claims, No Drawings

METHOD FOR STABILIZING AQUEOUS DISPERSIONS OF FLUORINATED POLYMERS

CROSS-REFERENCE TO RELATED APPLICATION

This application is a U.S. national stage entry under 35 U.S.C. § 371 of International Application No. PCT/EP2018/057008 filed Mar. 20, 2018, which claims priority to European application No. EP 17185838.4, filed on Aug. 11, 2017. The entire contents of these applications are explicitly incorporated herein by this reference.

TECHNICAL FIELD

The present invention relates to a method for stabilizing aqueous dispersions, notably of polymers based on vinylidene fluoride (VDF), and to the use of the stabilized aqueous dispersion thus obtained in electrochemical applications.

BACKGROUND ART

Aqueous dispersions of fluoropolymer and applications thereof are widely known in the art.

For example, US 20020193500 (3M INNOVATIVE PROPERTIES COMPANY) discloses a process for preparation of a fluoroelastomer latex, said process comprising the steps of (A) forming an aqueous emulsion of monomers capable of being copolymerized to form a fluoroelastomer; (B) polymerizing said emulsion at a temperature of about 40° C. to 130° C. and a pressure of about 2 to 9 MPa to form a fluoroelastomer emulsion composition; (C) adding a sufficient amount of base to adjust the pH of said fluoroelastomer emulsion composition to between 5 to 9; and (D) concentrating said fluoroelastomer emulsion composition which has a pH of 5 to 9, to form a solids-rich fluoroelastomer latex. The emulsion of step (A) comprises a first monomer selected from vinylidene fluoride (VDF) and tetrafluoroethylene (TFE), at least one other fluorine-containing monomer, a free radical initiator, a fluorinated surfactant and a base. Following the preparation of the fluoroelastomer emulsion composition, its pH is adjusted by addition of a base. The pH of the polymerization reaction mixture should be maintained in the range from 3 to 8, preferably from 5 to 8.

This patent application lists several fluorinated surfactants suitable for use during step (A), as well as fluorinated and non-fluorinated surfactants suitable for further stabilizing the composition. However, this patent application only discloses fluoroelastomers, i.e., fluoro-carbon based synthetic rubbers, but it is completely silent about semi-crystalline polymers. In addition, this patent application neither faces the problem of providing a latex suitable for use in battery application not provides any hint to select a surfactant for this specific use.

Similarly, EP 1897902 A (DAIKIN IND LTD) Dec. 3, 2008 discloses a method of producing an aqueous fluoropolymer dispersion comprising a step (1) of adding a nonionic surfactant to an aqueous fluoropolymer dispersion to be treated, a step (2) of phase-separating into a supernatant phase and an aqueous fluoropolymer dispersion phase following the step (1), and a step (3) of recovering the aqueous fluoropolymer dispersion phase by removing the supernatant phase, stirring being provided in the step (2). According to this document, the addition of the nonionic surfactant may be made after adjustment of the aqueous fluoropolymer dispersion to be treated to pH 3 to 12 with aqueous ammonia, for instance. Among fluoropolymers, is mention made of VDF-based polymers (such as VDF/HFP copolymers, VDF/chlorotrifluoroethylene [CTFE] copolymers, VDF/TFE copolymers, VDF/perfluoro(alkyl vinyl ether) [PAVE] copolymers, VDF/TFE/HFP copolymers, VDF/TFE/CTFE copolymers and VDF/TFE/PAVE copolymers).

US 20100304270 (ARKEMA INC.) discloses an aqueous fluoropolymer, preferably polyvinylidene fluoride (PVDF), composition for the manufacture of electrodes for use in non-aqueous-type electrochemical devices, such as batteries and electric double layer capacitors. The composition contains aqueous PVDF binder, and one or more powdery electrode-forming materials.

Vinylidene fluoride (VDF) polymers are known in the art to be suitable as binders for the manufacture of electrodes and/or composite separators, and/or as coatings of porous separators for use in non-aqueous-type electrochemical devices such as batteries, preferably secondary batteries, and electric double layer capacitors.

In this field, a continuous quest exists for aqueous dispersions of VDF polymers possessing all required properties for being used in the field of components for secondary batteries, including notably ability to deliver cohesion with electrode active materials and/or with composite separators' inorganic fillers, ability to ensure adhesion to metal collectors, separator porous substrates, stability/non-dissolution towards liquid electrolyte solutions and prevention of contamination with chemicals possibly interfering with electrochemical reactions (e.g. fluorosurfactant having not sufficient electrochemical stability), while yet possessing adequate properties for processing, including shear stability during formulation and casting, acceptable shelf life.

Now, techniques for manufacturing VDF dispersions are generally based on aqueous emulsion polymerization, typically in the presence of fluorinated emulsifiers, which are generally difficult to be removed from resulting dispersions, and which may have detrimental effects as contaminants in electrochemical devices parts. While attempts to reduce or even eliminate fluorosurfactants in emulsion polymerization of VDF so as to deliver stable VDF polymers dispersions free therefrom are known, those techniques are understood to be based to self-stabilization of polymer chains through end groups' chemistry. Increasing molecular weight would reduce overall concentration of chain ends, leading hence to lack of stabilization phenomena.

U.S. Pat. No. 5,880,204 (ALLIED SIGNAL INC.) discloses room temperature coalesceable aqueous fluoropolymer dispersions comprising particles of a block copolymer having a first semi-crystalline block and a second amorphous block, wherein first and second block are generally VDF or CTFE copolymers, and second block comprises generally a so-called "cure-site provider", which can be notably an acid such as acrylic acid. Generally the fluoropolymer, as a whole, possesses Mw of 10,000 to 1,000,000 (hence ranging from low to extremely high molecular weight). These dispersions are taught useful as floor polishes. Generally, latices are prepared in the absence of surfactants, using a redox initiating system at relatively low polymerization temperature.

WO 2013/010936 (SOLVAY SPECIALTY POLYMERS ITALY S.P.A.) pertains to an aqueous composition comprising: (A) an aqueous latex comprising at least one vinylidene fluoride (VDF) polymer [polymer (F)] comprising recurring units derived from vinylidene fluoride (VDF) and at least one (meth)acrylic monomer (MA) which is preferably acrylic acid (AA), (B) at least one powdery electrode material, and (C) optionally, less than 10 percent by weight, based on the total weight of the aqueous composition, of at least one organic solvent (S), wherein the polymer (F) in the aqueous latex is under the form of primary particles having an average primary particle size of less than 1 μm, as measured according to ISO 13321. This document also pertains to a process for manufacturing an electrode using said aqueous composition, to an electrode comprising a metal substrate coated on at least one surface with said aqueous composition and to use of said electrode for manufacturing a non-aqueous-type electrochemical device. The latices are prepared by aqueous emulsion polymerization at pressure of 20 to 70 bar and temperatures of 60 to 135° C., preferably 90 to 130° C., in the presence of a micro-emulsion or of a fluorosurfactant.

WO 2015/059155 (SOLVAY SA.) is directed to an electrode-forming composition comprising: (a) an aqueous latex comprising at least one fluoropolymer [polymer (F)] comprising recurring units derived from vinylidene fluoride (VDF), at least one hydrogenated monomer, which is preferably AA, and, optionally, at least one other fluorinated monomer different from VDF, and, homogeneously dispersed therein, (b) at least one powdery electrode-forming material consisting of Sulphur, (c) at least one powdery electrically conducting material, wherein the polymer (F) in the aqueous latex is under the form of primary particles having an average primary particle size of less than 1 μm, as measured according to ISO 13321. This document also pertains to a process for the manufacture of said composition and to use of said composition in a process for the manufacture of a positive electrode for a Lithium-Sulphur battery. The latices are prepared by aqueous emulsion polymerization at pressure of 20 to 70 bar and temperatures of 60 to 135° C., preferably 90 to 130° C., possibly in the presence of a micro-emulsion or a fluorosurfactant.

WO 2008/129041 (SOLVAY SOLEXIS S.P.A.) is directed to a linear semi-crystalline copolymer comprising recurring units derived from vinylidene fluoride (VDF) monomer and at least one hydrophilic (meth)acrylic monomer which is statistically distributed in the polymer chain, and to a method for its manufacture by suspension polymerization combined with step-wise addition of acrylic monomer.

WO 2013/120858 (SOLVAY SPECIALTY POLYMERS ITALY S.P.A.) is directed to a process for the manufacture of a composite separator for an electrochemical cell, said process comprising the following steps: (i) providing a substrate layer; (ii) providing a coating composition comprising:

an aqueous latex comprising at least one VDF polymer latex, and
at least one non-electroactive inorganic filler material;
(iii) applying said coating composition onto at least one surface of said substrate layer to provide a coating composition layer; and
(iv) drying said coating composition layer.

WO 2014/095907 (SOLVAY SPECIALTY POLYMERS ITALY S.P.A.) pertains to a process for the manufacture of a dense film, said process comprising providing a solid composition of a VDF fluoropolymer comprising carboxylic groups and at least one PAO; and processing said mixture in molten phase thereby providing a dense film, which can be used as dense separator in electrochemical devices.

However, the above mentioned documents do not specifically face the problem of stabilizing the fluoropolymer dispersion.

SUMMARY OF INVENTION

The Applicant recognized that there is a continuous shortfall in the art for aqueous dispersions of vinylidene fluoride (VDF)-based polymers, which possess improved performances in lithium batteries application, but which yet possess substantial stability to deliver appropriate shelf life and processability.

The Applicant surprisingly found that the above problem can be solved by a method comprising a first step of adjusting the pH of an aqueous dispersion of a VDF-based polymer to a value higher than 6.5 and a second step of adding a non-ionic surfactant comprising a primary alcohol group.

Thus, in a first aspect, the present invention relates to a method for stabilizing an aqueous dispersion [dispersion $(D_a)$] comprising particles of a (semi)crystalline VDF-based polymer [polymer (F)], said method comprising the following steps:
(I) providing said dispersion $(D_a)$;
(II) contacting said dispersion $(D_a)$ with at least one base so as to provide a VDF-based (semi)crystalline polymer aqueous dispersion [dispersion $(D_b)$] having a pH equal to or higher than 6.5 and lower than 9.0;
(III) contacting said dispersion $(D_b)$ obtained in step (II) with at least one non-ionic surfactant [compound (S)] comprising a hydrogenated linear alkyl chain comprising from 6 to 15 carbon atoms and a (poly)alkoxylated group comprising 2 or 3 carbon atoms, so as to provide stabilized aqueous dispersion [dispersion $(D_F)$].

The Applicant surprisingly found that the method according to the present invention, including notably a step of adjusting pH within a very precise range, enables producing an aqueous dispersion possessing sufficient stability against coagulation and which is not detrimentally affected by base additions, so as to ensure adequate shelf-life and processability in the absence of fluorinated surfactants, while showing outstanding behaviour in electrochemical cell components' field of use and avoiding presence of contaminants, such as fluoride ions, possibly resulting from base-induced side-reactions.

In a second aspect, the present invention relates to a VDF-based (semi)crystalline polymer aqueous dispersion [dispersion $(D_F)$] obtained by the above mentioned method.

DESCRIPTION OF EMBODIMENTS

As used within the present description and in the following claims:
the expression "(semi)crystalline polymer" is intended to indicate a polymer having a heat of fusion of more than 1 J/g, more preferably from 35 J/g to 1 J/g, even more preferably from 15 to 5 J/g, when measured by Differential Scanning calorimetry (DSC) at heating rate of 10°/min, according to ASTM D-3418;
the term "dispersion (D)" is intended to indicate each of dispersion $(D_a)$, dispersion $(D_b)$ and dispersion $(D_F)$, unless otherwise specified;
the term "dispersion (D)" is intended to indicate an aqueous dispersion comprising particles of at least one polymer (F), said particles having an average size of less than 1 μm, as measured according to ISO 13321, and hence the terms "dispersion (D)" and "latex" are intended as synonyms.

According to a preferred embodiment, said compound (S) complies with the following formula (S-I):

$$A\text{-}(R^1\text{—}O)_n\text{—}(R^2\text{—}O)_{n^*}\text{—}(R^3\text{—}O)_{n^{**}}\text{—}H \qquad (S\text{-}I)$$

wherein
A is a hydrogenated linear alkyl chain comprising from 6 to 15 carbon atoms;
$R^1$, $R^2$ and $R^3$, each independently, is an alkoxylated group comprising 2 or 3 carbon atoms;
n is an integer from 2 to 100, and
n* and n**, each independently, is an integer from 0 to 100.

Preferably, A is a hydrogenated linear alkyl chain comprising from 8 to 15 carbon atoms.

Preferably, n is an integer from 8 to 80.

Preferably, n* and n**, each independently, is an integer from 0 to 80.

Mixtures comprising two or more of said compounds (S) are also encompassed by the present invention.

According to a preferred embodiment, n** is 0, n* is an integer from 2 to 80 and n is an integer from 2 to 50, $R^1$ and $R^2$ equal to each other are an alkoxylated group comprising 2 or 3 carbon atoms.

According to another embodiment, n* and n** are both 0, $R^1$ is an alkoxylated group comprising 2 carbon atoms and n is an integer from 10 to 80.

According to another embodiment, n and n** equal to each other are an integer from 2 to 50, n* is an integer from 10 to 80, $R^1$ and $R^3$ equal to each other are an alkoxylated group comprising 2 carbon atoms and $R^2$ is an alkoxylated group comprising 3 carbon atoms.

According to a preferred embodiment, said compound (S) does not comprise a secondary alcohol group. Without being bound by any theory, the Applicant is of the opinion that if compound (S) comprises one (or more) secondary alcohol group, the secondary alcohol group is prone to being hydrolysed and hence it is not sufficiently stable for electrochemical application.

According to a preferred embodiment, said compound (S) is selected from Rhodasurf® (commercially available from Solvay Group), Genapol® (commercially available from Clariant—Coatings & Construction Chemicals), Empilan® KI (commercially available from Huntsman), Lutensol® TO and/or Pluronic® (commercially available from BASF), Marlosol® TA (commercially available from Sasol Performance Chemicals), and NOVEL® TDA-9 (commercially available from Sasol).

A particularly preferred compound (S) is a mixture of compounds of formula (S-I), as above detailed, wherein A is a hydrogenated linear alkyl chain having 13 carbon atoms, R1 is a —CH2-CH2- group, n* has an averaged value of 7 to 9 and n* and n** are 0, which may be supplied under trade name Marlosol® TA3090 or under trade name NOVEL® TDA-9, from different sources.

Preferably, said polymer (F) comprises recurring units derived from vinylidene fluoride (VDF) and recurring units derived from at least one hydrophilic (meth)acrylic monomer [monomer (MA)].

Preferably, said polymer (F) further comprises recurring units derived from at least one other co-monomer [co-monomer (C)] different from VDF and from said monomer (MA).

Said co-monomer (C) can be either a hydrogenated co-monomer [co-monomer ($C_H$)] or a fluorinated co-monomer [co-monomer ($C_F$)].

By the term "hydrogenated co-monomer [co-monomer ($C_H$)]", it is hereby intended to denote an ethylenically unsaturated co-monomer free of fluorine atoms.

Non-limitative examples of suitable hydrogenated co-monomers ($C_H$) include, notably, ethylene, propylene, vinyl monomers such as vinyl acetate, as well as styrene monomers, like styrene and p-methylstyrene.

By the term "fluorinated co-monomer [co-monomer ($C_F$)]", it is hereby intended to denote an ethylenically unsaturated co-monomer comprising at least one fluorine atom.

In a preferred embodiment, said co-monomer (C) is co-monomer ($C_F$).

Non-limitative examples of suitable fluorinated co-monomers ($C_F$) include, notably, the followings:
(a) $C_2$-$C_8$ fluoro- and/or perfluoroolefins, such as tetrafluoroethylene (TFE), hexafluoropropylene (HFP), pentafluoropropylene and hexafluoroisobutylene;
(b) $C_2$-$C_8$ hydrogenated monofluoroolefins, such as vinyl fluoride, 1,2-difluoroethylene and trifluoroethylene;
(c) $CH_2=CH-R_{f0}$, wherein $R_{f0}$ is a $C_1$-$C_6$ perfluoroalkyl group;
(d) chloro- and/or bromo- and/or iodo-$C_2$-$C_6$ fluoroolefins such as chlorotrifluoroethylene (CTFE);
(e) $CF_2=CFOR_{f1}$, wherein $R_{f1}$ is a $C_1$-$C_6$ fluoro- or perfluoroalkyl group, e.g. —$CF_3$, —$C_2F_5$, —$C_3F_7$;
(f) $CF_2=CFOX_0$, wherein $X_0$ is a $C_1$-$C_{12}$ oxyalkyl group or a $C_1$-$C_{12}$ (per)fluorooxyalkyl group having one or more ether groups, e.g. perfluoro-2-propoxy-propyl group;
(g) $CF_2=CFOCF_2OR_{f2}$, wherein $R_{f2}$ is a $C_1$-$C_6$ fluoro- or perfluoroalkyl group, e.g. —$CF_3$, —$C_2F_5$, —$C_3F_7$ or a $C_1$-$C_6$ (per)fluorooxyalkyl group having one or more ether groups, e.g. —$C_2F_5$—O—$CF_3$;
(h) (per) fluorodioxoles of formula:

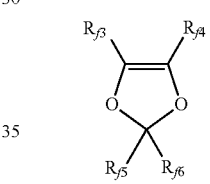

wherein each of $R_{f3}$, $R_{f4}$, $R_{f5}$ and $R_{f6}$, equal to or different from each other, is independently a fluorine atom, a $C_1$-$C_6$ fluoro- or per(halo)fluoroalkyl group, optionally comprising one or more oxygen atoms, e.g. —$CF_3$, —$C_2F_5$, —$C_3F_7$, —$OCF_3$, —$OCF_2CF_2OCF_3$.

Most preferred co-monomer ($C_F$) are tetrafluoroethylene (TFE), trifluoroethylene (TrFE), chlorotrifluoroethylene (CTFE), hexafluoropropylene (HFP), perfluoromethyl vinyl ether (PMVE), perfluoropropyl vinyl ether (PPVE) and vinyl fluoride.

According to a preferred embodiment, said co-monomer ($C_F$) is HFP.

Should at least one co-monomer (C) be present, the polymer (F) comprises typically from 0.05% to 14.5% by moles, preferably from 1.0% to 13.0% by moles, of recurring units derived from said comonomer(s) (C), with respect to the total moles of recurring units of polymer (F).

According to this embodiment, said co-monomer (C) is preferably selected from co-monomer ($C_F$) as detailed above, and even more preferably it is HFP.

According to a preferred embodiment, said polymer (F) comprises an amount of recurring units derived from vinylidene fluoride of at least 85.0 mol %, preferably of at least 86.0 mol %, more preferably at least 87.0 mol %, so as not to impair the excellent properties of vinylidene fluoride resin, such as chemical resistance, weatherability, and heat resistance. For instance, when polymer (F) comprises an amount of VDF units of less than 85.0 mol %, it cannot be used for formulating coating compositions for making composite separators for batteries, as the corresponding polymer would dissolve in the liquid solvent used as electrolyte liquid phase.

The term "at least one hydrophilic (meth)acrylic monomer [monomer (MA)]" is understood to mean that the polymer (F) may comprise recurring units derived from one or more than one monomer (MA) as above described. In the rest of the text, the expressions "hydrophilic (meth)acrylic monomer [monomer (MA)]" and "monomer (MA)" are understood, for the purposes of the present invention, both in the plural and the singular, that is to say that they denote both one or more than one hydrophilic (meth)acrylic monomer.

According to certain embodiments, polymer (F) consists essentially of recurring units derived from VDF, and of recurring units derived from said monomer (MA).

According to other embodiments, polymer (F) consists essentially of recurring units derived from VDF, of recurring units derived from HFP and of recurring units derived from said monomer (MA).

Polymer (F) may still comprise other moieties such as defects, end-groups and the like, which do not affect nor impair its physico-chemical properties.

Said monomer (MA) preferably complies with formula:

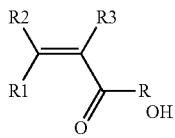

wherein each of R1, R2, R3, equal or different from each other, is independently an hydrogen atom or a $C_1$-$C_3$ hydrocarbon group, and $R_{OH}$ is a hydroxyl group or a $C_1$-$C_5$ hydrocarbon moiety comprising at least one hydroxyl group Non limitative examples of said monomer (MA) are notably acrylic acid, methacrylic acid, hydroxyethyl (meth)acrylate, hydroxypropyl(meth)acrylate; hydroxyethylhexyl (meth)acrylates.

Said monomer (MA) is more preferably selected among:

hydroxyethylacrylate (HEA) of formula:

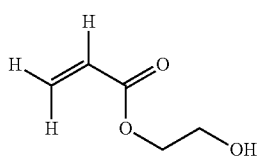

2-hydroxypropyl acrylate (HPA) of either of formulae:

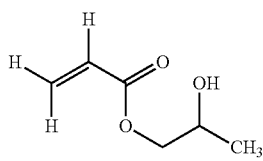

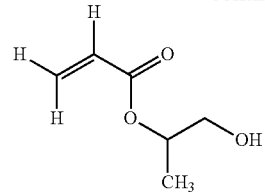

acrylic acid (AA) of formula:

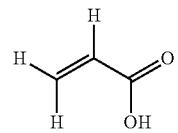

and mixtures thereof.

More preferably, said monomer (MA) is AA and/or HEA, even more preferably is AA.

Determination of the amount of monomer (MA) recurring units in polymer (F) can be performed by any suitable method. Mention can be notably made of acid-base titration methods, well suited e.g. for the determination of the acrylic acid content, of NMR methods, adequate for the quantification of said monomers (MA) comprising aliphatic hydrogens in side chains (e.g. HPA, HEA), of weight balance based on total fed monomer (MA) and unreacted residual monomer (MA) during polymer (F) manufacture.

Preferably, polymer (F) comprises at least 0.1, more preferably at least 0.2% moles of recurring units derived from said monomer (MA).

Preferably, polymer (F) comprises at most 10, more preferably at most 7.5% moles, even more preferably at most 5% moles, most preferably at most 3% moles of recurring units derived from said monomer (MA).

Generally, particles of polymer (F) possess a primary particle average size of less than 1 μm.

For the purpose of the present invention, the term "primary particles" is intended to denote primary particles of polymer (F) deriving directly from aqueous emulsion polymerization process, without isolation of the polymer from the emulsion.

Primary particles of polymer (F) are thus to be intended distinguishable from agglomerates (i.e. collection of primary particles), which might be obtained by recovery and conditioning steps of such polymer manufacture such as concentration and/or coagulation of aqueous latexes of the polymer (F) and subsequent drying and homogenization to yield the respective powder. Dispersion (D) according to the present invention is thus distinguishable from an aqueous slurry that can be prepared by dispersing powders of a polymer in an aqueous medium. The average particle size of powders of a polymer or copolymer dispersed in an aqueous slurry is typically higher than 1 μm, as measured according to ISO 13321.

Preferably, the primary particles average size of the particles of polymer (F) in dispersion (D) is above 20 nm, more preferably above 30 nm, even more preferably above 50 nm as measured according to ISO 13321.

Preferably, the primary particles average size is below 600 nm, more preferably below 400 nm and even more preferably below 350 nm as measured according to ISO 13321.

As said, dispersion (D) is substantially free from fluorinated surfactants.

The expression "substantially free" in combination with the amount of fluorinated surfactants in dispersion (D) is to be meant to exclude the presence of any significant amount of said fluorinated surfactants, e.g. requiring the fluorinated surfactants to be present in an amount of less than 5 ppm, preferably of less than 3 ppm, more preferably of less than 1 ppm, with respect to the total weight of dispersion (D).

The aqueous emulsion polymerization process as detailed above is typically carried out in the presence of at least one radical initiator.

Polymerization pressure ranges typically between 20 and 70 bar, preferably between 25 and 65 bar.

While the choice of the persulfate radical initiator is not particularly limited, it is understood that radical initiators suitable for an aqueous emulsion polymerization process are selected from compounds capable of initiating and/or accelerating the polymerization process and include, but are not limited to, sodium, potassium and ammonium persulfates.

One or more radical initiators as defined above may be added to the aqueous medium as defined above in an amount ranging advantageously from 0.001% to 20% by weight based on the weight of the aqueous medium.

Preferably, said dispersion ($D_a$) is manufactured via emulsion polymerization, by contacting VDF and said at least one monomer (MA), in the presence of a persulfate inorganic initiator, at a temperature of at most 80° C., under a pressure of at least 20 bar.

Preferably, the above emulsion polymerization is performed in the absence (in other words, without adding) any fluorinated surfactant.

However, if required by the circumstances, said dispersion ($D_a$) can be manufactured such that the amount of fluorinated surfactants is present in an amount of less than 5 ppm, preferably of less than 3 ppm, more preferably of less than 1 ppm, with respect to the total weight of dispersion ($D_a$).

The aqueous emulsion polymerization process as detailed above is typically carried out in the presence of at least one radical initiator.

Polymerization pressure ranges typically between 20 and 70 bar, preferably between 25 and 65 bar.

While the choice of the persulfate radical initiator is not particularly limited, it is understood that radical initiators suitable for an aqueous emulsion polymerization process are selected from compounds capable of initiating and/or accelerating the polymerization process and include, but are not limited to, sodium, potassium and ammonium persulfates.

One or more radical initiators as defined above may be added to the aqueous medium as defined above in an amount ranging advantageously from 0.001% to 20% by weight based on the weight of the aqueous medium.

Preferably, said step (II) is performed by using a base selected from ammonia, dimethylethanolamina (DMEA), diethylethanolamina (DEEA), diethanolamina (DEA), triethanolamina (TEA), propyl amine and mixtures thereof.

In step (II) of contacting said dispersion ($D_a$) with at least one base, as above described, a dispersion ($D_b$) having a pH equal to or higher than 6.5 and lower than 9.0, and preferably of lower than 8.7, even more preferably of lower than 8.5 is provided.

Values of pH within said ranges have been surprisingly found to be very effective for improving colloidal stability of the dispersion ($D_F$), resulting from the method of the invention, while not substantially detrimentally effecting the properties of polymer (F), and without exposing the same to substantial base-catalysed/base-induced decomposition/defluorination, which may lead to discolouring, and/or to release in the aqueous phase of contaminants, such as fluoride ions.

Preferably, at the end of step (II), dispersion ($D_b$) having a pH of from 6.5 to 8.7 is provided, preferably of from 6.5 to 8.5, even more preferably from 7 to 8.

Values of pH of 9 or more are to be avoided as it has been surprisingly found that they cause discolouring of polymer (F) and generation of significant amounts of fluoride ions, due to hydrofluorination side-reactions occurring on VDF-derived recurring units of polymer (F), which may detrimentally affect performances of the dispersion ($D_F$) for its intended uses.

Advantageously, the pH of final dispersion ($D_F$) is not negatively affected by the addition of compound (S), in other words the pH of said dispersion ($D_b$) and of said dispersion ($D_F$) coincides.

Advantageously, said dispersion ($D_F$) is used to provide a coating onto a separator for electrochemical cells.

An aqueous coating composition suitable for coating separators can be obtained by adding and dispersing a non-electroactive inorganic filler material, and optional additives, into said dispersion ($D_F$).

Thus, another object of the present invention is an aqueous coating composition [composition (AC)] comprising dispersion ($D_F$), as above detailed, at least one non-electroactive inorganic filler material and, optionally, one or more than one additional additive.

By the term "non-electroactive inorganic filler material", it is hereby intended to denote an electrically non-conducting inorganic filler material which is suitable for the manufacture of an electrically insulating separator for electrochemical cells.

The non-electroactive inorganic filler material in the separator according to the invention typically has an electrical resistivity (p) of at least $0.1 \times 10^{10}$ ohm cm, preferably of at least $0.1 \times 10^{12}$ ohm cm, as measured at 20° C. according to ASTM D 257.

Non-limitative examples of suitable non-electroactive inorganic filler materials include, notably, natural and synthetic silicas, zeolites, aluminas, titanias, metal carbonates, zirconias, silicon phosphates and silicates and the like.

The non-electroactive inorganic filler material is typically under the form of particles having an average size of from 0.01 μm to 50 μm, as measured according to ISO 13321.

Optional additives in composition (AC) include notably viscosity modifiers, as detailed above, anti-foams, non-fluorinated surfactants, and the like.

Among non-fluorinated surfactants, mention can be made of non-ionic emulsifiers, such as notably alkoxylated alcohols, e.g. ethoxylates alcohols, propoxylated alcohols, mixed ethoxylated/propoxylated alcohols; of anionic surfactants, including notably fatty acid salts, alkyl sulfonate salts (e.g. sodium dodecyl sulfate), alkylaryl sulfonate salts, arylalkyl sulfonate salts, and the like.

Said composition (AC) may be obtained from said dispersion ($D_F$), for example by a process comprising one of the following:

(i) formulating said dispersion ($D_F$) with optional additives, as above detailed; or (ii) up-concentrating dispersion ($D_F$), notably through standard techniques like ultra-filtration, clouding, and the like; or (iii) using dispersion ($D_F$) as such, as obtained from emulsion polymerization; or (iv) by diluting dispersion ($D_F$) with water, or through a combination of above techniques.

Generally, said composition (AC) is obtained by mixing:
(i) dispersion ($D_F$), as above detailed, in an amount of from 5 to 25 wt. %;
(ii) at least one non-electroactive inorganic filler material, in an amount of from 70 to 95 wt. %;
(iii) one or more than one additional additive, in an amount of 0 to 5 wt. %; and
(iv) optionally, adding water for adjusting solid contents in the range of 30 to 80 wt. %, preferably 40 to 60 wt. %.

The solid contents of said composition (AC) is understood to be cumulative of all non-volatile ingredients thereof, notably including polymer (F) and non-electroactive inorganic filler material.

Still another object of the present invention is a method for the manufacture of a composite separator notably suitable for use in an electrochemical cell, said method comprising the following steps:
(1) providing a porous substrate having at least one surface;
(2) providing an aqueous coating composition comprising said dispersion ($D_F$), at least one non-electroactive inorganic filler material and, optionally, at least one or more than one additional additive, i.e. the composition (AC), as above detailed;
(3) applying said composition (AC) onto at least one surface of said porous substrate to provide a coating composition layer; and
(4) drying said coating composition layer at a temperature of at least 60° C., to provide said composite separator.

By the term "separator", it is hereby intended to denote a porous polymeric material which electrically and physically separates electrodes of opposite polarities in an electrochemical cell and is permeable to ions flowing between them.

By the term "electrochemical cell", it is hereby intended to denote an electrochemical cell comprising a positive electrode, a negative electrode and a liquid electrolyte, wherein a monolayer or multilayer separator is adhered to at least one surface of one of said electrodes.

Non-limitative examples of electrochemical cells include, notably, batteries, preferably secondary batteries, and electric double layer capacitors.

For the purpose of the present invention, by "secondary battery" it is intended to denote a rechargeable battery. Non-limitative examples of secondary batteries include, notably, alkaline or alkaline-earth secondary batteries, more preferably lithium batteries.

The composite separator obtained from the method of the invention is advantageously an electrically insulating composite separator suitable for use in an electrochemical cell.

In step (3) of the method of the invention, said composition (AC) is typically applied onto at least one surface of the porous substrate by a technique selected from casting, spray coating, roll coating, doctor blading, slot die coating, gravure coating, ink jet printing, spin coating and screen printing, brush, squeegee, foam applicator, curtain coating, vacuum coating.

Non-limitative examples of suitable porous substrate include, notably, porous membranes made from inorganic, organic and naturally occurring materials, and in particular made from nonwoven fibers (cotton, polyamides, polyesters, glass), from polymers (polyethylene, polypropylene, poly (tetrafluoroethylene), poly(vinyl chloride), and from certain fibrous naturally occurring substances (e.g. asbestos).

Advantageous results have been obtained when the porous support was a polyolefin porous support, e.g. a polyethylene or a polypropylene porous support.

In step (4) of the method of the invention, the coating composition layer is dried preferably at a temperature comprised between 60° C. and 200° C., preferably between 70° C. and 180° C.

Further to the above, an aqueous electrode-forming composition may be obtained by adding and dispersing a powdery electrode material (an active substance for a battery or an electric double layer capacitor), and optional additives, such as an electroconductivity-imparting additive and/or a viscosity modifying agent, into said dispersion ($D_F$).

Also an object of the invention is thus an aqueous electrode-forming composition comprising dispersion ($D_F$), as above detailed, a powdery electrode material and, optionally, an electroconductivity-imparting additive and/or a viscosity modifying agent.

Among viscosity modifying agents, a thickener may be added in order to prevent or slow down the settling of the powdery electrode material from the aqueous composition of the invention. Non-limitative examples of suitable thickeners include, notably, organic thickeners such as partially neutralized poly(acrylic acid) or poly(methacrylic acid), carboxylated alkyl cellulose like carboxylated methyl cellulose and inorganic thickeners such as natural clays like montmorillonite and bentonite, manmade clays like laponite and others like silica and talc.

In the case of forming a positive electrode for a lithium ion battery, the active substance may comprise a composite metal chalcogenide represented by a general formula of $LiMY_2$, wherein M denotes at least one species of transition metals such as Co, Ni, Fe, Mn, Cr and V; and Y denotes a chalcogen, such as 0 or S. Among these, it is preferred to use a lithium-based composite metal oxide represented by a general formula of $LiMO_2$, wherein M is the same as above. Preferred examples thereof may include: $LiCoO_2$, $LiNiO_2$, $LiNi_xCo_{1-x}O_2$ (0<x<1), and spinel-structured $LiMn_2O_4$.

In the case of forming a negative electrode for a lithium battery, the active substance may preferably comprise a carbonaceous material, such as graphite, activated carbon or a carbonaceous material obtained by carbonization of phenolic resin, pitch, etc. The carbonaceous material may preferably be used in the form of particles having an average diameter of ca. 0.5-100 μm.

An electroconductivity-imparting additive may be added in order to improve the conductivity of a resultant composite electrode layer formed by applying and drying of the electrode-forming composition of the present invention, particularly in case of using an active substance, such as $LiCoO_2$, showing a limited electron-conductivity. Examples thereof may include: carbonaceous materials, such as carbon black, graphite fine powder and fiber, and fine powder and fiber of metals, such as nickel and aluminum.

The active substance for an electric double layer capacitor may preferably comprise fine particles or fiber, such as activated carbon, activated carbon fiber, silica or alumina particles, having an average particle (or fiber) diameter of 0.05-100 μm and a specific surface area of 100-3000 m²/g, i.e., having a relatively small particle (or fiber) diameter and a relatively large specific surface area compared with those of active substances for batteries.

The preferred electrode-forming composition for positive electrodes comprises:
(a) polymer (F), in an amount from 1 to 10 wt. %, preferably from 2 to 9 wt. %, more preferably about 3 wt. %, with respect to the total weight of components (a)+(b)+(c);
(b) carbon black as electroconductivity-imparting additive, in an amount from 2 to 10 wt. %, preferably from 4 to 6 wt. %, more preferably about 5 wt. %, with respect to the total weight of components (a)+(b)+(c);
(c) a powdery electrode material, preferably a composite metal chalcogenide represented by a general formula of $LiMY_2$, as above detailed, in an amount from 80 to 97 wt. %, preferably from 85 to 94 wt. %, more preferably about 92 wt. %.

The present invention will be now described in more detail with reference to the following examples, whose purpose is merely illustrative and not limitative of the scope of the invention.

Experimental Section

Materials
Pluronic® F108: block copolymer surfactant of formula PEG-PPG-PEG, CAS number 9003-11-6 was obtained by Sigma-Aldrich Marlosol® TA3090: isotridecanol ethoxylates 013, CAS number 69011-36-5 was obtained by BRENNTAG AG.

Synthesis 1—Manufacture of Aqueous VDF-HFP-AA Polymer Dispersion (Polymer A1)

In a 21 lt. horizontal reactor autoclave equipped with baffles and stirrer working at 50 rpm, 13.5 lt. of deionised water were introduced. The temperature was brought to 80° C. and the pressure of 35 Bar ass was maintained constant throughout the whole trial by feeding VDF/HFP gaseous mixture monomers in a mol ration of 99:1 respectively.

250 ml of a 100 g/l aqueous solution of ammonium persulfate (APS) were added over a period of 15 minutes (1 L/h) then the solution of ammonium persulfate (APS) was continuously added at a flux rate of 60 ml/h for the whole duration of the run; in addition, 50 ml of a solution of acrylic acid (AA) (50 g/l of acrylic acid in water) were fed every 250 g of monomers consumed.

When 4500 g of the mixture were fed, the feeding mixture was interrupted, then the pressure was let to fall down up to 12 bar while keeping the reaction temperature constant. Final reaction time was 223 min. The reactor was cooled to room temperature and latex was recovered.

The VDF-HFP-AA polymer so obtained contained 98.3% by moles of VDF, about 1.0% by moles of HFP and 0.7% by moles of acrylic acid (AA) monomer.

The aqueous latex so obtained had a solid content of 24.8% by weight.

The VDF-HFP-AA polymer was dispersed in the aqueous latex under the form of particles having an average primary size of 243 nm, as measured according to ISO 13321, was found to possess a melting point of 153.6° C. (determined according to ASTM D3418) a MV (230° C./100 sec$^{-1}$) of 67 kPoise and a content of end groups as follows: —$CF_2H$: 35 mmol/kg; —$CF_2$—$CH_3$: 19 mmol/kg; —$CH_2OH$: 8 mmol/kg.

Synthesis 2—Manufacture of Aqueous VDF-AA Polymer Dispersion (Polymer A2)

In a 21 lt. horizontal reactor autoclave equipped with baffles and stirrer working at 50 rpm, 13.5 lt. of deionised water were introduced. The temperature was brought to 90° C. and the pressure of 20 Bar Ass was maintained constant throughout the whole trial by feeding VDF gaseous monomer. 15 ml of a 100 g/l aqueous solution of ammonium persulfate (APS) were added over a period of 5 minutes (200 ml/h) and at the same time 22 ml of a solution of acrylic acid (AA) (40 g/l of acrylic acid in water) were fed every 225 g of polymer synthesized. After 30 minutes, additional amount of solution of APS was added at a flux rate of 240 ml/h for the whole duration of the run.

When 4500 g of the mixture were fed, the feeding mixture was interrupted, then the pressure was let to fall down up to 12 bar while keeping the reaction temperature constant. Final reaction time was 164 min.

The reactor was cooled to room temperature and the latex recovered. The VDF-AA polymer so obtained contained 99.55% by moles of VDF and 0.45% by moles of acrylic acid (AA) monomer.

The aqueous latex so obtained had a solid content of 24.2% by weight.

The VDF-AA polymer was dispersed in the aqueous latex under the form of particles having an average primary size of 189 nm, as measured according to ISO 13321, was found to possess a melting point of 160° C. (determined according to ASTM D3418) and a MV (230° C./100 sec$^{-1}$) of 23 kPoise.

Synthesis 3—Manufacture of Aqueous VDF-HFP-AA Polymer Dispersion (Polymer B1)

In a 21 lt. horizontal reactor autoclave equipped with baffles and stirrer working at 50 rpm, 13.5 lt. of deionised water were introduced. The temperature was brought to 75° C. and the pressure of 35 Bar Ass was maintained constant throughout the whole trial by feeding VDF/HFP gaseous mixture monomers in a mol ration of 99:3 respectively. 290 ml of a 100 g/l aqueous solution of ammonium persulfate (APS) were added over a period of 17 minutes (1 L/h), and the solution of APS was then fed at a flux rate of 60 ml/h for the whole duration of the run; 50 ml of a solution of acrylic acid (AA) (50 g/l of acrylic acid in water) were fed every 250 g of monomers consumed.

When 4500 g of the mixture were fed, the feeding mixture was interrupted, then the pressure was let to fall down up to 12 bar while keeping the reaction temperature constant. Final reaction time was 318 min. The reactor was cooled to room temperature, the latex was unloaded.

The VDF-HFP-AA polymer so obtained contained 96.13% by moles of VDF, 2.97% by moles of HFP and 0.9% by moles of acrylic acid (AA) monomer.

The aqueous latex so obtained had a solid content of 24.0% by weight.

The VDF-HFP-AA polymer was dispersed in the aqueous latex under the form of particles having an average primary size of 287 nm, as measured according to ISO 13321, was found to possess a melting point of 144° C. (determined according to ASTM D3418), a MV (230° C./100 sec$^{-1}$) of 31 kPoise, and a content of end groups as follows: —$CF_2H$: 35 mmol/kg; —$CF_2$—$CH_3$: 23 mmol/kg; —$CH_2OH$: 5 mmol/kg.

Synthesis 4—Manufacture of Aqueous VDF-HFP-AA Polymer Dispersion (Polymer B2)

In a 21 lt. horizontal reactor autoclave equipped with baffles and stirrer working at 50 rpm, 13.5 lt. of deionised water were introduced. The temperature was brought to 90° C. and the pressure of 30 Bar Ass was maintained constant throughout the whole trial by feeding VDF/HFP gaseous mixture monomers in a molar ratio of 99:3 respectively. 250 ml of a 100 g/l aqueous solution of ammonium persulfate (APS) were added over a period of 15 minutes (1 L/h) and at the same time 50 ml of a solution of acrylic acid (AA) (50 g/l of acrylic acid in water) were fed every 250 g of polymer synthesized.

After 30 minutes, the solution of APS was fed at a flux rate of 240 ml/h for the whole duration of the run. When 4500 g of the mixture were fed, the feeding mixture was interrupted, the pressure was let to fall down up to 12 bar while keeping the reaction temperature constant. Final reaction time was 125 min. The reactor was cooled to room temperature, the latex was recovered.

The VDF-HFP-AA polymer so obtained contained 96.13% by moles of VDF, 2.97% by moles of HFP and 0.9% by moles of acrylic acid (AA) monomer.

The aqueous latex so obtained had a solid content of 25.4% by weight.

The VDF-HFP-AA polymer was dispersed in the aqueous latex under the form of particles having an average primary size of 220 nm, as measured according to ISO 13321, was found to possess a melting point of 141° C. (determined according to ASTM D3418), a MV (230° C./100 sec$^{-1}$) of 22 kPoise.

Synthesis 5—Manufacture of Aqueous VDF-HFP-AA Polymer Dispersion (Polymer C1)

In a 2 lt. horizontal reactor autoclave equipped with baffles and stirrer working at 50 rpm, 13.5 lt. of deionised water were introduced. The temperature was brought to 75° C. then HFP gaseous monomer is charge till obtain deltaP of 6.1 bar. The pressure of 35 bar was maintained constant throughout the whole trial by feeding VDF/HFP gaseous mixture monomers in a molar ratio of 87.5:12.5 respectively. 250 ml of a 100 g/l aqueous solution of ammonium persulfate (APS) were added over a period of 15 minutes (1 L/h) then continue to add the solution of ammonium persulfate (APS) with a flux rate of 60 ml/h for the whole duration of the trial together with 50 ml of a solution of acrylic acid (AA) (50 g/l of acrylic acid in water) were fed every 250 g of polymer synthesized.

When 4500 g of the mixture were fed, the feeding mixture was interrupted, then the pressure was let to fall down up to 12 bar while keeping the reaction temperature constant. Final reaction time was 326 min. The reactor was cooled to room temperature, the latex was unloaded.

The VDF-HFP-AA polymer so obtained contained 86.72% moles of VDF, 12.38% moles of HFP and 0.9% by moles of acrylic acid (AA) monomer. The aqueous latex so obtained had a solid content of 25.6% by weight.

The VDF-HFP-AA polymer was dispersed in the aqueous latex under the form of particles having an average primary size of 273 nm, as measured according to ISO 13321, was found to possess a melting point of 89° C. (determined according to ASTM D3418), a MV (230° C./100 sec$^{-1}$) of 48.6 kPoise, and a content of end groups as follows: —CF$_2$H: 29 mmol/kg; —CF$_2$—CH$_3$: 10 mmol/kg; —CH$_2$OH: 7 mmol/kg.

Synthesis 6—Manufacture of Aqueous VDF-HFP-AA Polymer Latex (Polymer C$_2$)

In a 2 lt. horizontal reactor autoclave equipped with baffles and stirrer working at 50 rpm, 13.5 lt. of deionised water were introduced. The temperature was brought to 90° C. and the pressure of 30 Bar was maintained constant throughout the whole trial by feeding VDF/HFP gaseous mixture monomers in a molar ratio of 87.5:12.5 respectively. 250 ml of a 100 g/l aqueous solution of ammonium persulfate (APS) were added over a period of 15 minutes (1 L/h) and at the same time 50 ml of a solution of acrylic acid (AA) (50 g/l of acrylic acid in water) were fed every 250 g of polymer synthesized.

After 30 minutes from the ignition restart to add the solution of ammonium persulfate (APS) with a flux rate of 240 ml/h for the whole duration of the trial. When 4500 g of the mixture were fed, the feeding mixture was interrupted, then the pressure was let to fall down up to 12 bar while keeping the reaction temperature constant. Final reaction time was 141 min. The reactor was cooled to room temperature, the latex was unloaded.

The VDF-HFP-AA polymer so obtained contained 86.7% moles of VDF, 12.4% moles of HFP and 0.9% by moles of acrylic acid (AA) monomer. The aqueous latex so obtained had a solid content of 23.8% by weight.

The VDF-HFP-AA polymer was dispersed in the aqueous latex under the form of particles having an average primary size of 340 nm, as measured according to ISO 13321, was found to possess a melting point of 81.2° C. (determined according to ASTM D3418) and a MV (230° C./100 sec$^{-1}$) of 14 kPoise.

Synthesis 7—Manufacture of Aqueous VDF-HFP-AA Polymer Dispersion (Polymer D1)

In a 2 lt. horizontal reactor autoclave equipped with baffles and stirrer working at 50 rpm, 13.5 lt. of deionised water were introduced. The temperature was brought to 90° C. then HFP gaseous monomer is charge till obtain deltaP of 10.6 bar. The pressure of 35 bar was maintained constant throughout the whole trial by feeding VDF/HFP gaseous mixture monomers in a mol ration of 78.5:21.5 respectively.

220 ml of a 100 g/l aqueous solution of ammonium persulfate (APS) were added over a period of 13 minutes (1 L/h) then continue to add the solution of ammonium persulfate (APS) with a flux rate of 60 ml/h for the whole duration of the trial together with 50 ml of a solution of acrylic acid (AA) (50 g/l of acrylic acid in water) were fed every 250 g of polymer synthesized.

The temperature of polymerization was reduced to 75° C. after 450 g of conversion. When 4500 g of the mixture were fed, the feeding mixture was interrupted, then the pressure was let to fall down up to 12 bar while keeping the reaction temperature constant. Final reaction time was 269 min. The reactor was cooled to room temperature, the latex was unloaded.

The VDF-HFP-AA polymer so obtained contained 77.8% by moles of VDF, 21.3% by moles of HFP and 0.9% by moles of acrylic acid (AA) monomer.

The aqueous latex so obtained had a solid content of 25.7% by weight.

The VDF-HFP-AA polymer was dispersed in the aqueous latex under the form of particles having an average primary size of 292 nm, as measured according to ISO 13321, was found to possess a Tg=-21.1° C. (determined according to ASTM D3418), a MV (230° C./100 sec$^{-1}$) of 40 kPoise and Mooney ((1+10')@121° C.) of 158.1, and a content of end groups as follows: —CF$_2$H: 25 mmol/kg; —CF$_2$—CH$_3$: 37 mmol/kg; —CH$_2$OH: 7 mmol/kg.

Synthesis 8—Manufacture of Aqueous VDF-HFP-AA Polymer Dispersion (Polymer D2)

In a 2 lt. horizontal reactor autoclave equipped with baffles and stirrer working at 50 rpm, 13.5 lt. of deionised water were introduced. The temperature was brought to 90° C. then HFP gaseous monomer is charge till obtain deltaP of 8.8 bar. The pressure of 30 Bar Ass was maintained constant throughout the whole trial by feeding VDF/HFP gaseous mixture monomers in a molar ratio of 78.5:21.5 respectively. 250 ml of a 100 g/l aqueous solution of ammonium persulfate (APS) were added over a period of 15 minutes (1 L/h)

and at the same time 50 ml of a solution of acrylic acid (AA) (50 g/l of acrylic acid in water) were fed every 250 g of polymer synthesized.

After 30 minutes from the ignition restart to add the solution of ammonium persulfate (APS) with a flux rate of 240 ml/h for the whole duration of the trial. When 4500 g of the mixture were fed, the feeding mixture was interrupted, then the pressure was let to fall down up to 12 bar while keeping the reaction temperature constant. Final reaction time was 285 min. The reactor was cooled to room temperature, the latex was unloaded.

The VDF-HFP-AA polymer so obtained contained 77.8% by moles of VDF, 21.3% by moles of HFP and 0.9% by moles of acrylic acid (AA) monomer.

The aqueous latex so obtained had a solid content of 24% by weight.

The VDF-HFP-AA polymer was dispersed in the aqueous latex under the form of particles having an average primary size of 285 nm, as measured according to ISO 13321, was found to possess a possess a Tg=−15.9° C. (determined according to ASTM D3418), a MV (230° C./100 sec$^{-1}$) of 23 kPoise and Mooney ((1+10')@121° C.) of 63.3, and a content of end groups as follows: —CF$_2$H: 68 mmol/kg; —CF$_2$—CH$_3$: 15 mmol/kg; —CH$_2$OH: 38 mmol/kg.

The properties of the latexes prepared according to Examples 1 to 8 are summarized in Table 1 herein below:

TABLE 1

| Synthesis | Polymers | VDF/HFP mol:mol | $T_m$ ° C. | MV (kPoise) @100 sec$^{-1}$ |
|---|---|---|---|---|
| Ex. 1 | A1 | 99:1 | 153.6 | 67 |
| Ex. 2 | A2 | 100:0 | 160.0 | 23 |
| Ex. 3 | B1 | 97:3 | 144.0 | 31 |
| Ex. 4 | B2 | 97:3 | 140.0 | 22 |
| Ex. 5 | C1 | 87.5:12.5 | 89.0 | 49 |
| Ex. 6 | C2 | 87.5:12.5 | 81.2 | 14 |
| Ex. 7 | D1 | 78.5:21.5 | (*)$T_g$ = −21.1 | 40 |
| Ex. 8 | D2 | 78.5:21.5 | (*)$T_g$ = −15.9 | 23 |

(*)no detectable melting point

Preparation of Latex 1A 18.4 Kg at 25.5 wt. % of Polymer A2 (having at the end of the polymerization pH=2.4) were discharged from the polymerization reactor into a 40 L glass reactor equipped with baffles and mechanical stirrer set at 250 rpm.

The pH was adjusted dripping a solution of ammonia (40 ml, at 29 wt. %) until final pH of 7.5.

The latex was maintained under stirrer and 3300 g of a solution of Pluronic® F-108 diluted with deionised water at 10 wt. % was added in 135 minutes at a rate of 25 ml/min.

The solid content at the end of stabilization was 21.6 wt. %.

Latex 1A thus contained Pluronic® F-108 in an amount of 1.8 wt. % based on the total weight of Latex 1A.

Preparation of Latex 1B

Latex 1B was prepared following the same procedure described above for Latex 1, but adding a solution of 1830 g of Pluronic® F-108 diluted with deionised water at 10 wt. % at a rate of 25 ml/min.

Latex 1B thus contained Pluronic® F-108 in an amount of 1 wt. % based on the total weight of Latex 1B.

Preparation of Latex 2

19.5 Kg at 25 wt. % of Polymer B2 (having at the end of the polymerization pH=2.0) were discharged from the polymerization reactor into a 40 L glass reactor equipped with baffles and mechanical stirrer set at 250 rpm.

The pH was adjusted dripping a solution of ammonia (44 ml, at 29 wt. %) until the final pH of 7.1.

The latex was maintained under stirrer and 1403 g of a solution of Marlosol® TA3090 diluted with deionised water at 25 wt. % was added in 120 minutes at a rate of about 10 ml/min.

The solid content at the end of stabilization was 23.9 wt. %.

Latex 2 thus contained Marlosol® TA3090 in an amount of 1.5 wt. % based on the total weight of Latex 2.

Preparation of Latex 3

18.2 Kg at 25.5 wt. % of Polymer A2 (having at the end of the polymerization pH=2.4) were discharged from the polymerization reactor into a 40 L glass reactor equipped with baffles and mechanical stirrer set at 250 rpm.

The pH was adjusted dripping a solution of ammonia (40 ml, at 29 wt. %) until the final pH pf 7.35.

The latex was maintained under stirrer and 1093 g of a solution of Marlosol® TA3090 diluted with deionised water at 25 wt. % was added in 85 minutes at a rate of about 13 ml/min.

The solid content at the end of stabilization was 23.6 wt. %.

Latex 3 thus contained Marlosol® TA3090 in an amount of 1.5 wt. % based on the total weight of Latex 3.

Preparation of Concentrated Latexes

Latex 2 and Latex 3 prepared as described above, were circulated via a peristaltic pump through an ultra-filtration unit composed of a bundle of tubular ultra-filtration filters, wherein the liquid aqueous phase were removed until the following solid content were reached:

for Latex 2U, solid content of 53.6 wt. %, with 2.56 wt. % of residual Marlosol® TA 3090; and for Latex 3U, solid content of 52.7 wt. % with 2.54 wt. % of residual Marlosol® TA 3090.

Example 1—Accelerated Test with Climatic Chamber @37° C.

0.5 L of each Latex 1 to 3 prepared as detailed above, were closed in a glass bottle and stored in a climatic chamber set at 37° C.

Method (A)

The evaluation of the solid content was performed with a thermos balance (Mod Crystal Therm—Gibertini). Once a week, after gentle shaking the bottle, a portion of each latex was withdrawn and heated up to 180° C. The amount of water left was a measured of the final percentage of solid content.

Method (B)

Every month, after gentle shaking each latex, a portion of each latex was withdrawn and the diameter of the particles was evaluated by light scattering technique.

The results obtained for Polymer A2 and Polymer B2 are reported in the following Tables 2 to 4.

As comparison, the following Latexes were prepared by adding the surfactant to the Polymers as obtained at the end of the polymerization reaction, i.e. without adjusting the pH:

Latex C1, with pH=2 and comprising Polymer A2 plus 1 wt. % Pluronic® F-108;

Latex C2, with pH=2 and comprising Polymer B2 only;

Latex C3, with pH=2 and comprising Polymer B2 plus 1.5 wt. % Marlosol® TA3090.

TABLE 2

| | Latex C1(*) | | Latex 1B | | Latex 1A | |
| days | S.C. % | dp (nm) | S.C. % | dp (nm) | S.C. % | dp (nm) |
| --- | --- | --- | --- | --- | --- | --- |
| 3 | 22.87 | 296 | 22.87 | 296 | 21.62 | 296 |
| 10 | 22.66 | n/p | 22.67 | n/p | 21.48 | n/p |
| 45 | 20.48 | 348 | 22.71 | n/p | 21.88 | n/p |
| 50 | coagulated | | 22.63 | 305 | 21.83 | 324 |
| 100 | — | | 22.52 | 315 | 21.69 | 290 |
| 150 | — | | 22.06 | 303 | 20.73 | 300 |
| 200 | — | | 18.89 | 294 | 20.23 | 300 |

(*)comparison
S.C. = solid content
dp = particle diameter
n/p = not performed

TABLE 3

| | Latex C2(*) | | Latex C3(*) | | Latex 2 | |
| days | S.C. % | dp (nm) | S.C. % | dp (nm) | S.C. % | dp (nm) |
| --- | --- | --- | --- | --- | --- | --- |
| 6 | 25.01 | 220 | 23.95 | 220 | 24.0 | 220 |
| 20 | 25.46 | n/p | 24.21 | n/p | n/p | n/p |
| 55 | 22.7 | 248 | 25.0 | 236 | 25.52 | 216 |
| 62 | coagulated | | 25.03 | 238 | 25.42 | 220 |
| 100 | — | | 24.62 | 265 | 25.45 | 223 |
| 132 | — | | 7.91 | 365 | 25.35 | 223 |
| 150 | — | | coagulated | | 24.48 | 222 |
| 200 | — | | — | | 24.96 | 230 |

(*)comparison
S.C. = solid content
dp = particle diameter
n/p = not performed

TABLE 4

| | Latex 3U | | Latex 2U | |
| days | S.C. % | dp (nm) | S.C. % | dp (nm) |
| --- | --- | --- | --- | --- |
| 10 | 53.64 | 240 | 52.76 | 220 |
| 50 | 53.30 | 247 | 52.03 | 237 |
| 100 | 52.52 | 254 | 52.12 | 250 |
| 150 | 52.52 | 249 | 52.68 | 241 |
| 170 | 39.03 | n/p | 52.35 | 241 |

S.C. = solid content
dp = particle diameter
n/p = not performed

Effect of Variable Adjusted pH in Step (II) Starting from Latexes of Polymer A2 and B2

Three latex samples having 0.5 Kg weight each, and comprising 23.39 wt. % of Polymer A2, were obtained from a Polymer A2 latex which was obtained by polymerization, as above detailed, and which possessed at the end of the polymerization a pH=2.12.

First sample was the Polymer A2 latex, as polymerized, with no ammonia addition. In a second sample, the pH was adjusted dripping a solution of ammonia under stirrer until final pH of 6.9 (adding 3 ml of aqueous ammonia at 29% vol/vol); in a third sample, the pH was adjusted in similar manner up to a value of 9.01 (adding 9.5 ml of aqueous ammonia at 29% v). Water was added to the three samples, so as to ensure exactly same final volume, so as to render meaningful fluoride concentration determinations.

Similarly, three latex samples having 0.5 Kg weight each, and comprising 24.43 wt. % of Polymer B2, were obtained from a Polymer B2 latex which was obtained by polymerization, as above detailed, and which possessed at the end of the polymerization a pH=2.31.

First sample was the Polymer B2 latex, as polymerized, with no ammonia addition. In a second sample, the pH was adjusted dripping a solution of ammonia under stirrer until final pH of 7.0 (adding 4.5 ml of aqueous ammonia at 29% vol/vol) and 9.02 (adding 13 ml of aqueous ammonia at 29% vol/vol). Water was added to the three samples, so as to ensure exactly same final volume, so as to render meaningful fluoride concentration determinations and maintain substantially same solids contents.

The different samples were inspected for their colour characteristics after 12 hours; a specimen of each of the samples was submitted to cryogenic coagulation, and the surnatant aqueous phase was submitted to centrifugation at 10 000 rpm for 10 minutes, and diluted 1:50 before being submitted to liquid ionic chromatography for fluoride quantification. Results are collected in Table below.

Colour inspection results, as detailed below, was carried out comparing coagulated polymers, indicating as WHITE those products with no distinguishable shade of colour, and as YELLOWISH those products clearly deviating from an off-white shade.

TABLE 5

| Samples | Adjusted pH | Colour of polymer | Fluorides |
| --- | --- | --- | --- |
| From latex of Polymer A2 | native (pH = 2.12) | WHITE | 215 |
| | adjusted to pH = 6.90 | WHITE | 250 |
| | adjusted to pH 9.01 | YELLOWISH | 275 |
| From latex of Polymer B2 | native (pH = 2.31) | WHITE | 225 |
| | adjusted to pH = 7.0 | WHITE | 260 |
| | adjusted to pH = 9.02 | YELLOWISH | 285 |

Results summarized below well confirm the criticality of the selection of an appropriate pH for the adjustment of pH in Step (II) of the method of the invention.

The invention claimed is:

1. A method for stabilizing an aqueous dispersion ($D_a$) comprising particles of a (semi)crystalline VDF-based polymer (F), said method comprising:
   contacting said dispersion ($D_a$) with at least one base so as to provide a VDF-based (semi)crystalline polymer aqueous dispersion ($D_b$) having a pH equal to or higher than 6.5 and lower than 9.0; and
   contacting said aqueous dispersion ($D_b$) with at least one compound (S), wherein compound (S) is at least one non-ionic surfactant comprising a hydrogenated linear alkyl chain comprising from 6 to 15 carbon atoms and a (poly)alkoxylated group comprising 2 or 3 carbon atoms, so as to provide stabilized aqueous dispersion ($D_F$).

2. The method according to claim 1, wherein said compound (S) complies with the following formula (S-I):

$$A-(R^1-O)_n-(R^2-O)_{n*}-(R^3-O)_{n**}-H \qquad (S-I)$$

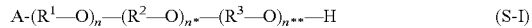

wherein

A is a hydrogenated linear alkyl chain comprising from 6 to 15 carbon atoms;

$R^1$, $R^2$ and $R^3$, each independently, is an alkoxylated group comprising 2 or 3 carbon atoms;

n is an integer from 2 to 100 n* and n**, each independently, is an integer from 0 to 100.

3. The method according to claim 2, wherein in said formula (S-I):

n** is 0, n* is an integer from 2 to 80 and n is an integer from 2 to 50, $R^1$ and $R^2$ equal to each other are an alkoxylated group comprising 2 or 3 carbon atoms; or n* and n are both 0, $R^1$ is an alkoxylated group comprising 2 carbon atoms and n is an integer from 10 to 80; or n and n equal to each other are an integer from 2 to 50, n* is an integer from 10 to 80, $R^1$ and $R^3$ equal to each other are an alkoxylated group comprising 2 carbon atoms and $R^2$ is an alkoxylated group comprising 3 carbon atoms.

4. The method according to claim 2, wherein compound (S) is a mixture of two or more of compounds (S-I).

5. The method according to claim 1, wherein said polymer (F) comprises recurring units derived from derived from vinylidene fluoride (VDF), recurring units derived from at least one hydrophilic (meth)acrylic monomer (MA), and optionally recurring units derived from at least one other co-monomer (C) different from VDF and from said monomer (MA).

6. The method according to claim 5, wherein said co-monomer (C) is selected from hydrogenated co-monomer ($C_H$); or fluorinated co-monomer ($C_F$).

7. The method according to claim 6, wherein said co-monomer ($C_F$) is selected from the group consisting of:

tetrafluoroethylene (TFE), trifluoroethylene (TrFE), chlorotrifluoroethylene (CTFE), hexafluoropropylene (HFP), perfluoromethyl vinyl ether (PMVE), perfluoropropyl vinyl ether (PPVE) and vinyl fluoride.

8. The method according to claim 5, wherein said monomer (MA) complies with formula:

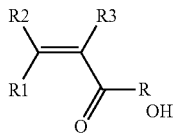

wherein each of R1, R2, R3, equal or different from each other, is independently an hydrogen atom or a C1-C3 hydrocarbon group, and ROH is a hydroxyl group or a C1-C5 hydrocarbon moiety comprising at least one hydroxyl group.

9. The method according to claim 8, wherein said monomer (MA) is selected from the group consisting of acrylic acid, methacrylic acid, hydroxyethyl (meth)acrylate, hydroxypropyl(meth)acrylate, and hydroxyethylhexyl (meth)-acrylates.

10. The method according to claim 1, wherein said particles of polymer (F) have an average size above 20 nm; and/or below 600 nm, as measured according to ISO 13321.

11. The method according to claim 1, wherein the VDF-based (semi)crystalline polymer aqueous dispersion ($D_b$) has a pH of from 6.5 to 8.7.

12. An aqueous coating composition (AC) comprising dispersion ($D_F$) as defined in claim 1, at least one non-electroactive inorganic filler material and, optionally, one or more than one additional additive.

13. A method for the manufacture of a composite separator suitable for use in an electrochemical cell, said method comprising:

applying a composition (AC) according to claim 1 onto at least one surface of a porous substrate to provide a coating composition layer; and drying said coating composition layer at a temperature of at least 60° C., to provide said composite separator.

14. The method according to claim 13, wherein said porous substrate is selected from porous membranes made from inorganic, organic and naturally occurring materials.

15. An aqueous electrode-forming composition comprising dispersion ($D_F$) as defined in claim 1, a powdery electrode material and, optionally, an electroconductivity-imparting additive and/or a viscosity modifying agent.

16. The method according to claim 6, wherein said co-monomer (C) is selected from hydrogenated co-monomers ($C_H$) selected from the group consisting of: ethylene, propylene, vinyl acetate, styrene and p-methylstyrene; or fluorinated co-monomers ($C_F$) selected from the group consisting of:

(a) $C_2$-$C_8$ fluoro- and/or perfluoroolefins;

(b) $C_2$-$C_8$ hydrogenated monofluoroolefins;

(c) $CH_2=CH-R_{f0}$, wherein $R_{f0}$ is a $C_1$-$C_6$ perfluoroalkyl group;

(d) chloro- and/or bromo- and/or iodo-$C_2$-$C_6$ fluoroolefins;

(e) $CF_2=CFOR_{f1}$, wherein $R_{f1}$ is a $C_1$-$C_6$ fluoro- or perfluoroalkyl group;

(f) $CF_2=CFOX_0$, wherein $X_0$ is a $C_1$-$C_{12}$ oxyalkyl group or a $C_1$-$C_{12}$ (per)fluorooxyalkyl group having one or more ether groups;

(g) $CF_2=CFOCF_2OR_{f2}$, wherein $R_{f2}$ is a $C_1$-$C_6$ fluoro- or perfluoroalkyl group or a $C_1$-$C_6$ (per)fluorooxyalkyl group having one or more ether groups;

(h) (per) fluorodioxoles of formula:

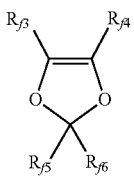

wherein each of $R_{f3}$, $R_{f4}$, $R_{f5}$ and $R_{f6}$, equal to or different from each other, is independently a fluorine atom, a $C_1$-$C_6$ fluoro- or per(halo)fluoroalkyl group, optionally comprising one or more oxygen atoms.

17. The method according to claim 10, wherein said particles of polymer (F) have an average size above 30 nm; and/or below 400 nm, as measured according to ISO 13321.

18. The method according to claim 10, wherein said particles of polymer (F) have an average size above 50 nm; and/or below 350 nm, as measured according to ISO 13321.

19. The method according to claim 11, wherein the VDF-based (semi)crystalline polymer aqueous dispersion ($D_b$) has a pH of from 7 to 8.

20. The method according to claim 14, wherein said porous substrate is selected from porous membranes made from nonwoven cotton fibers, nonwoven polyamide fibers, nonwoven polyester fibers, nonwoven glass fibers, polyethylene polymers, polypropylene polymers, poly(tetrafluoroethylene) polymers, poly(vinyl chloride) polymers, and/or asbestos.

* * * * *